T. HARDING.
FOLDING IMPLEMENT.
APPLICATION FILED APR. 15, 1915.

1,194,381.  
Patented Aug. 15, 1916.

WITNESS  
Howard P. King

INVENTOR:  
Thomas Harding,  
BY  
Russell M. Everett,  
ATTORNEY.

UNITED STATES PATENT OFFICE.

THOMAS HARDING, OF NEWARK, NEW JERSEY, ASSIGNOR TO J. L. SOMMER MANUFACTURING CO., A CORPORATION OF NEW JERSEY.

FOLDING IMPLEMENT.

1,194,381. Specification of Letters Patent. Patented Aug. 15, 1916.

Application filed April 15, 1915. Serial No. 21,514.

*To all whom it may concern:*

Be it known that I, THOMAS HARDING, a citizen of the United States, residing in Newark, in the county of Essex and State of New Jersey, have invented certain new and useful Improvements in Folding Implements, of which the following is a specification.

The objects of this invention are to provide an implement which can be folded into small compass when not in use and protect the tool member; to provide means for retaining the tool member in its open or closed position; to avoid springs and other movable parts; to positively prevent the tool member from opening farther than in alinement with the handle; to limit the inward or closing swing of the tool member; to secure simplicity of construction and operation, and to obtain other advantages and results as may be brought out in the following description.

Figure 1:
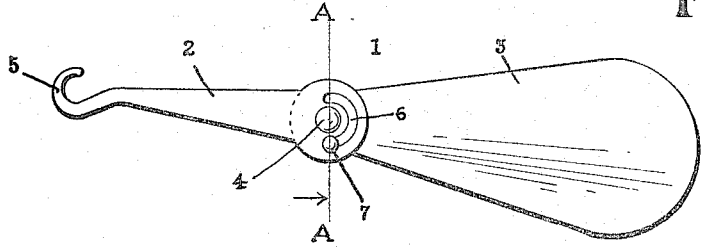
Figure 2:
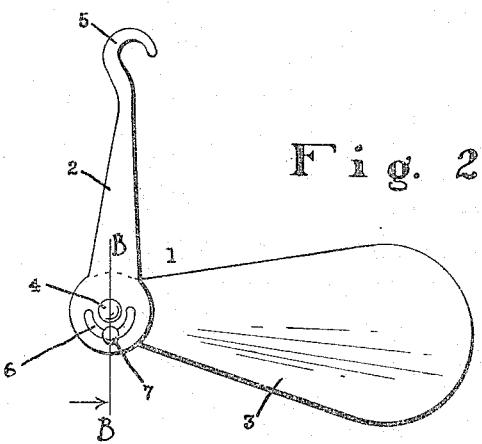
Figure 3:
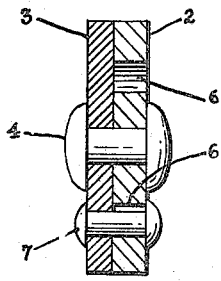
Figure 4:
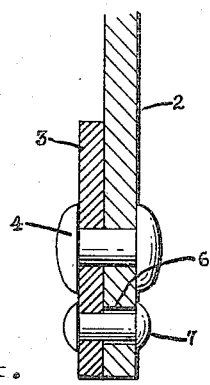

Referring to the accompanying drawings, in which like numerals of reference indicate the same parts throughout the several views, Figure 1 is a side view of a folding button hook constructed in accordance with my invention and open ready for use; Fig. 2 is a similar view showing the device partially closed; Fig. 3 is a transverse sectional view on line A—A of Fig. 1, and Fig. 4 is a sectional view on line B—B of Fig. 2.

In the specific embodiment of the invention illustrated in said drawings, the reference numeral 1 indicates a button hook having a shank or hook member 2 and a handle member 3, hinged flatwise together as by a rivet 4 extending transversely through both said members. At its pivoted end, the hook member is substantially disk-shape, the rivet 4 passing through the center thereof, and the shank tapers from the pivoted end to the outer or free end where it is bent into a hook 5 preferably flatwise of the shank. The handle member 3 is similarly made disk-shaped at its pivoted end and provides an extended surface against which the disk-shaped end of the hook member may bear and prevent relative twisting of the two members. Preferably the side edges of the handle member diverge from the disk-shaped end so that the free end of the handle member is wider than the pivoted end. Furthermore, the free or wider end of the handle is preferably rounded and the handle otherwise shaped and adapted to be used as a shoe horn. Obviously, however this added utility or function need not be restricted to shoe horns but the handle may be given any shape necessary to obtain a desired utility therefor.

It will be understood that the pivotal connection between the hook and handle members permits the same to be extended into substantially a straight line, and allows them to be closed or swung to superposed position with the members lying closely together so that the hook will be protected by the handle member. In order to limit the swing so the members will not go past their open or closed positions, an arcuate slot 6 is provided in the disk-shaped portion of one of the members around the pivot 4. In the drawings this slot is shown in the hook member, and a stud or pin 7 is shown extending from the handle member into said slot.

In the detail construction shown, the stud projects from the handle member at a point thereof in a line through the pivot 4 substantially perpendicular to the length of the handle, and at a distance from said pivot. Furthermore, the stud is upon the side of the pivot which brings it adjacent the back edge of the hook member when said member is in its extended or open position. The slot is substantially semi-circular and is cut so its ends are toward the hooked end of the member and its middle part upon the opposite side of the pivot 4 therefrom. Obviously, therefore, to close the hook member from its open position shown in Fig. 1, the member has to be swung forwardly or in the direction of the open side of the hook, and is limited in the distance it may be swung by the end of the slot engaging the stud.

By the arrangement of parts shown and above described, the hook member may be swung through an angle of substantially 180°, and when in its extended or open position it receives pressure against the front of the hook, such as would be exerted in use, the hook member cannot open farther than such position because of the engagement of the stud with the end of the slot. To swing the hook member, pressure must be exerted in the opposite direction or from the back thereof.

In order to retain the hook member in either its opened or closed position unless a positive pressure is exerted to change its position, I provide frictional means operating at the extreme positions but not impairing free swing at intermediate positions. The construction here shown for effecting this result utilizes the slot and stud above described, and for this purpose the slot is made eccentric with respect to the pivotal mounting of the members preferably so that the end portions of the slot are closer to the pivot 4 than the middle part of the slot, though said end portions might be farther from the pivot than the middle part of the slot. The stud is proportioned to ride freely in the middle part of the slot but positioned so as to bind against a side wall of the slot when at either end thereof. Sufficient frictional engagement may thus be afforded to retain the hook member in either of its extreme positions until positively swung therefrom.

It will be understood that other means may be provided for holding the hook or tool member in its open and closed position; that the slot may be in either of the two hinged members, as desired, and the stud in the other one; that the shape of the superposed hinged ends of the members may be other than disk-like as shown, and that other detail modifications may be made without departing from the spirit and scope of the invention. Furthermore it will be obvious that the invention is in no way limited to a button hook, and I have described it as applied to a button hook only for purposes of illustration.

The invention can be used in any implement having a handle member and a tool member and I therefore do not wish to be understood as restricting myself herein except as required by the following claims when construed in the light of the prior art.

Having thus described the invention, what I claim is:

1. The combination of a handle member, and a tool member pivoted thereto, one of said members having a wall eccentric to the pivotal mounting of the members and the other having a shoulder adapted to bind against a portion of said eccentric wall for frictionally retaining said members swung in one direction.

2. The combination of a handle member, and a tool member pivoted thereto, one of said members having a wall eccentric to the pivotal mounting of the members with a stop at the end of said wall and the other having a shoulder adapted to bind against a portion of said eccentric wall adjacent the stop as the shoulder approaches said stop thereby frictionally retaining said members swung in one direction.

3. The combination of a handle member, and a tool member pivoted thereto, one of said members having an arcuate slot eccentric to the pivotal mounting of the members and the other having a stud or pin adapted to engage the end of said slot as a stop to limit swinging of said members and adapted to bind against the side wall of the slot as it approaches the end thereof whereby said members are frictionally held in swung position.

4. The combination of a handle member, and a tool member pivoted thereto, one of said members having an arcuate slot eccentric to the pivotal mounting of the members and the other having a stud or pin adapted to ride freely in the middle part of said slot and bind against the end portion of one of the side walls of the slot.

5. The combination of a handle member, and a tool member pivoted thereto, one of said members having an arcuate slot eccentric to the pivotal mounting of the members and the other having a stud or pin adapted to ride freely in the middle part of said slot and bind against an end portion of a side wall of the slot adjacent both ends thereof.

6. The combination of a handle member, and a tool member pivoted thereto, one of said members having an arcuate slot one end of which is closer to the center of pivoting than its middle portion and the other member having a stud or pin adapted to ride freely in said middle portion of the slot and bind against the end portion of one of the side walls of the slot at said closer end thereof.

7. The combination of a handle member, and a tool member pivoted thereto, one of said members having an arcuate slot with its ends closer to the center of pivoting than its middle portion and the other member having a stud or pin adapted to ride freely in said middle portion of the slot and bind against end portions of a side wall of the slot adjacent the ends thereof.

THOMAS HARDING.

Copies of this patent may be obtained for five cents each, by addressing the "Commissioner of Patents, Washington, D. C."